United States Patent
Debabrata et al.

(10) Patent No.: US 11,242,260 B2
(45) Date of Patent: Feb. 8, 2022

(54) PROCESS FOR PREPARING PRECIPITATED SILICA

(71) Applicant: Tata Chemicals Limited, Mumbai (IN)

(72) Inventors: Rautaray Debabrata, Pune (IN); Parida Prabhat Kumar, Pune (IN); Lolage Mayura, Pune (IN); Phadtare Sumant, Pune (IN)

(73) Assignee: Tata Chemicals Limited, Mumbai (IN)

(*) Notice: Subject to any disclaimer, the term of this patent is extended or adjusted under 35 U.S.C. 154(b) by 673 days.

(21) Appl. No.: 16/065,533

(22) PCT Filed: Dec. 22, 2016

(86) PCT No.: PCT/IB2016/057918
§ 371 (c)(1),
(2) Date: Jun. 22, 2018

(87) PCT Pub. No.: WO2017/109740
PCT Pub. Date: Jun. 29, 2017

(65) Prior Publication Data
US 2020/0115245 A1      Apr. 16, 2020

(30) Foreign Application Priority Data
Dec. 23, 2015   (IN) .......................... 4837/MUM/2015

(51) Int. Cl.
*C01B 33/193* (2006.01)

(52) U.S. Cl.
CPC ........ *C01B 33/193* (2013.01); *C01P 2006/12* (2013.01); *C01P 2006/19* (2013.01); *C01P 2006/90* (2013.01)

(58) Field of Classification Search
CPC ....... C01B 33/00; C01B 33/193; C01B 33/20; C01B 33/24; C01B 33/22; C01B 33/32; C01P 2006/19; C01P 2006/12; C01P 2006/90
See application file for complete search history.

(56) References Cited

U.S. PATENT DOCUMENTS

| | | | |
|---|---|---|---|
| 6,180,076 B1 * | 1/2001 | Uhrlandt | C01B 33/193 423/335 |
| 7,566,433 B2 | 7/2009 | Stenzel et al. | |
| 7,790,131 B2 | 9/2010 | Stenzel et al. | |
| 7,871,588 B2 | 1/2011 | Lindner et al. | |
| 9,327,988 B2 * | 5/2016 | Hagar | C01B 33/18 |
| 2003/0082090 A1 | 5/2003 | Blume et al. | |

FOREIGN PATENT DOCUMENTS

| | | | |
|---|---|---|---|
| EP | 0 900 829 A1 | 3/1999 | |
| EP | 0900829 A1 * | 3/1999 | ........... C09C 1/3081 |
| EP | 0 937 755 A1 | 8/1999 | |
| EP | 1 048 697 A2 | 11/2000 | |
| EP | 0 900 829 B1 | 11/2001 | |
| WO | WO 2017/109742 A1 | 6/2017 | |
| WO | WO 2017/109743 A1 | 6/2017 | |

OTHER PUBLICATIONS

Greener (NPL: "Interaction of Anionic Surfactants with Gelatin: Viscosity Effects", Macromolecules, vol. 20, No. 10, 1987 pp. 2490-2498).*
International Search Report and Written Opinion dated Apr. 18, 2017 for Application No. PCT/IB2016/057918, 11 pgs.
European Search Report, Supplementary, and Written Opinion dated May 6, 2019 for Application No. EP 16877883.5, 9 pgs.
European Examination Report dated Jan. 31, 2020 for Application No. EP 16877883.5, 6 pgs.
Indian Office Action, First Examination Report, dated Dec. 26, 2018 for Application No. 4837/MUM/2015, 6 pgs.

* cited by examiner

*Primary Examiner* — Smita S Patel
(74) *Attorney, Agent, or Firm* — Frost Brown Todd LLC

(57) ABSTRACT

A process of preparing precipitated silica is disclosed. Said process comprises of reacting an aqueous solution of a metal silicate with a mineral acid in the presence of a surfactant solution comprising gelatin and C8-C20 sulfosuccinate blend, at a reaction temperature in a range of about 70 to 100° C. with constant stirring such that a reaction mixture having a pH of about 10·0.3 is obtained; optionally, allowing the reaction mixture to age at a temperature in a range of about 70 to 100° C. for a time period in range of 10 to 100 minutes; adjusting the pH of the reaction mixture to about 4, followed by aging said mixture at a temperature in a range of about 70 to 100° C. for a time period in a range of 10 minutes to 2 hours; and recovering the precipitated silica from the reaction mixture.

10 Claims, No Drawings

PROCESS FOR PREPARING PRECIPITATED SILICA

FIELD OF DISCLOSURE

The present disclosure relates to a process of preparing precipitated silica suitable for use as reinforcing filler. Specifically, the present disclosure provides a process of preparing highly dispersible precipitated silica having specific morphology, structure, surface area, pore volume, pore size distribution and silanol group density.

BACKGROUND

Silica is well-known for use as a reinforcing filler in vulcanizable rubber mixtures, such as those used to form tyres. The reinforcing fillers used in tyre compounding are critical to achieving the performance requirements and substantially assist in strengthening the rubber network thereof, resulting in a substantial increase in stiffness, tensile strength, and resistance to abrasion. This in effect contributes in increasing the longevity of tyres while reducing the fuel consumption. The silica used in the tyre industry is generally precipitated silica, in particular characterized by its particle size, structure and surface activity.

An essential parameter for characterizing precipitated silica is the surface area which is determined either by the adsorption of nitrogen (commonly referred to as BET (after Brunauer, Emmett and Teller) surface area) or, by the adsorption of Cetyl trimethyl ammonium bromide (CTAB) on the surface of silica (commonly referred to as CTAB surface area). BET surface area provides total surface area, whereas CTAB surface area provides external surface area of silica. The ratio of said two parameters viz. BET/CTAB provides a measure of microporosity. Pore volume and pore size distribution are also important factors which determine the rubber and filler interaction.

Once silica is synthesized, primary particles condense into aggregates having dimensions of 100-200 nm. These are the real reinforcing species in rubber compounds. As the concentration of the aggregate particles increases, an interaction between them leads to the formation of bigger agglomerates. The degree of condensation in aggregates is designated by structure, determines the inter-particle void volume and pore diameter within the aggregates. The measurement of this "structure" is based on the adsorption of dibutyl phthalate (DBP) and is determined by the amount of absorbed DBP.

Another significant parameter which determines the dispersibility of silica is CDBP coefficient ($D_A$). This coefficient is calculated according to the difference in the DBP absorption between the primary uncompressed sample (DBPO) and sample after its compression at 40 MPa (Compressed DBP or CDBP), as shown in formula below:

$$D_A = 1 - (CDBP/DBPO)$$

This coefficient theoretically ranges from 0 to 1, whereas the higher the value of the coefficient, the weaker is the structure of the silica.

Another parameter, Wk coefficient, is the ratio of the peak height of the non-degradable particle, the maximum of which lies in the range of 1.0-100 microns, to the peak height of the degraded particles, the maximum of which lies in the range of <1 micron. The Wk coefficient provides a measurement of the "degradability" (dispersibility) of the precipitated silica.

It is known that the properties of precipitated silica affect the reinforcement properties thereof. It necessitates the need to identify the characteristic attributes of silica suited for different requirement profile of different applications. Depending on the requirement profile, these properties may vary.

For instance, EP 0 937 755 discloses that precipitated silicas which possess a BET surface area from about 180 to about 430 $m^2/g$ and a CTAB surface area from about 160 to 340 $m^2/g$ and a BET to CTAB ratio of about 1.1 to 1.3 are particularly suitable as carrier material. However, such a precipitated silica is not meant for application in elastomer and rubber compositions.

US20030082090 discloses that precipitated silica having very different BET ($\geq 135$ $m^2/g$) and CTAB surface areas ($\geq 75$ $m^2/g$) while remaining above minimum values are particularly suitable as fillers.

Apart from surface area, surface activity of silica, which is usually defined in terms of Scars number influences the properties of silica. Sears number is a measurement of the concentration of silanol groups on the precipitated silica. The silanol groups on the surface of precipitated silica function as potential chemical reaction sites for a coupling reagent, which permit coupling of the silica to the elastomer matrix. The ratio of Sears Number/CTAB surface area provides the concentration of silanol groups for a given level of CTAB surface area.

U.S. Pat. No. 7,566,433 discloses precipitated silica having a relative breadth γ of pore size distribution of 4.0-10.0 (g nm)/ml, a Scars Number of 28-40 ml/(5 g), a Scars Number/CTAB ratio of 0.18-0.28 ml/(5 $m^2$), and CAB of 100-200 $m^2/g$ and suggests that such precipitated silica are particularly suitable as reinforcing fillers. Further, disclosed precipitated silica has a BET/CTAB ratio greater than 1.3 and a zeta potential at pH 5 from −12 to −30 mV. The precipitated silica is obtained by controlling the addition of sulphuric acid such that prevailing alkali number in the reaction medium is 30.0±0.3. Additionally, the process employs organic/inorganic salt, as a result of which it contains residues of $Al_2O_3$ ranging from 0.01 to 5%.

U.S. Pat. No. 7,790,131 discloses that highly dispersible silica having BET surface area 200-300 $m^2/g$. CTAB surface area $\geq 170$ $m^2/g$, DBP number 200-300 g/(100 g), and Sears number 23 35 ml/(5 g) are particularly suited for use as a tire filler for utility vehicles, motor cycles and high speed vehicles. The precipitated silica having said properties is obtained by using organic and/or inorganic salt in the aqueous solution of 0.01 to 5 mol/l to get the desired properties.

Thus, although the various processes of preparing precipitated silica are known, these processes have certain disadvantages which make their application difficult/limited. Accordingly, there exists an industrial requirement for an economical, optimized process which could provide precipitated silica having certain controlled properties.

SUMMARY

A process of preparing precipitated silica is disclosed. Said process comprises of reacting an aqueous solution of a metal silicate with a mineral acid in the presence of a surfactant solution comprising gelatin and $C_8$-$C_{20}$ sulfosuccinate blend, at a reaction temperature in a range of about 70 to 100° C. with constant stirring such that a reaction mixture having a pH of about 10+0.3 is obtained; optionally, allowing the reaction mixture to age at a temperature in a range of about 70 to 100° C. for a time period in range of 10 to 100 minutes; adjusting the pH of the reaction mixture to about 4, followed by aging said mixture at a temperature in a range of about 70 to 100° C. for a time period in a range of 10 minutes to 2 hours; and recovering the precipitated silica from the reaction mixture.

DETAILED DESCRIPTION

For the purpose of promoting an understanding of the principles of the disclosure, reference will now be made to embodiments and specific language will be used to describe the same. It will nevertheless be understood that no limitation of the scope of the disclosure is thereby intended, such alterations and further modifications in the disclosed composition and method, and such further applications of the principles of the disclosure therein being contemplated as would normally occur to one skilled in the art to which the disclosure relates.

It will be understood by those skilled in the art that the foregoing general description and the following detailed description arc exemplary and explanatory of the disclosure and are not intended to be restrictive thereof. It will be further understood by those skilled in the art that the parameters such as BET surface area, CTAB surface area. CDBP coefficient ($D_A$), DBP absorption, Wk coefficient, sears number, have the same meaning as generally understood in the art, unless specifically stated otherwise.

Reference throughout this specification to "one embodiment" "an embodiment" or similar language means that a particular feature, structure, or characteristic described in connection with the embodiment is included in at least one embodiment of the present disclosure. Thus, appearances of the phrase "in one embodiment", "in an embodiment" and similar language throughout this specification may, but do not necessarily, all refer to the same embodiment.

In the broadest scope, the present disclosure relates to a process of preparing highly dispersible precipitated silica having specific morphology, structure, surface area, pore volume, pore size distribution, silanol group density. Said process comprises of:

reacting an aqueous solution of a metal silicate with a mineral acid in the presence of a surfactant solution comprising gelatin and $C_8$-$C_{20}$ sulfosuccinate blend, at a reaction temperature in a range of about 70 to 100° C. with constant stirring such that a reaction mixture having a pH of about 10+0.3 is obtained;

optionally, allowing the reaction mixture to age at a temperature in a range of about 70 to 100° C. for a time period in range of 10 minutes to 30 minutes;

adjusting the pH of the reaction mixture to about 4, followed by aging said mixture at a temperature in a range of about 70 to 100° C. for a time period in a range of 10 minutes to 2 hours; and recovering the precipitated silica from the reaction mixture.

It is believed that controlling the pH of the reaction mixture and using the surfactant solution comprising gelatin and $C_8$-$C_{20}$ sulfosuccinate blend results in controlling the properties of the precipitated silica.

In accordance with an aspect, the above disclosed process results in obtaining precipitated silica having the following physico-chemical characteristic data:

a CTAB surface area in a range of 80 to 230 $m^2$/g;
a BET surface area in a range of 100 to 250 $m^2$/g;
a BET/CTAB ratio in a range of 0.8-1.35;
a DBP oil absorption in a range of 240-320 ml/100 g,
a CDBP coefficient ($D_A$) in range of 0.4-0.9.
a scars number ($V_2$) in a range of 10 to 30 ml/(5 g); and
a scars number ($V_2$)/CTAB ratio in a range of 0.16-0.20 ml/(5 $m^2$).

In accordance with an embodiment, said precipitated silica alongside the parameters mentioned above has one or more of the following physico-chemical parameters, independently of one another:

an average primary particle size in a range of 8 50 nm;
an average particulate aggregate site (% of particles) in a range of 50-3000 nm;
a micro-pore area in a range of 6-35 $m^2$/g;
a tapped density in a range of 0.12-0.3 g/cc;
a bulk density in a range of 80 140 g/l;
a micro pore volume ranging from 0.01 to 0.06 $cm^3$/g;
a pore diameter ranging from 250 Å to 350 Å;
a moisture loss of 2 to 6% by weight, on drying for two hours at 105° C.;
a pH value of 6 6.5 (5% in water);
a Wk coefficient number less than 3;
a micro-pore volume ranging about 0.01 to 0.06 $cm^3$/g
a $SiO_2$ content or greater than 97%; and
soluble salts content of less than 0.5%.

In accordance with an embodiment, the surfactant solution is prepared by dissolving gelatin in water followed by addition of $C_8$-$C_{20}$ sulfosuccinate blend at 50 to 80° C. In accordance with an embodiment, the surfactant solution comprises gelatin and $C_8$-$C_{20}$ sulfosuccinate blend in a ratio ranging from 1:1 to 1:3, and preferably 1: 1.5. For example, the surfactant solution may be obtained by combining 4.5 grams of gelatin with 6.75 ml of a $C_8$-$C_{20}$ sulfosuccinate blend, such as Surfactant-OT 85 AE, commercially available from CYTEC.

In accordance with an embodiment, the metal silicate is selected from a group consisting of an alkali metal silicate, an alkaline earth metal silicate and mixture thereof. Preferably, sodium silicate is used as the metal silicate. The metal silicate can contain from 7-30 wt % $SiO_2$, and preferably 23 wt % $SiO_2$. In accordance with an embodiment, the aqueous solution of metal silicate is prepared by mixing the alkali metal silicate and/or alkaline earth metal silicate with water for a predetermined time period, preferably for 15 minutes, while stirring. In accordance with a related embodiment, the metal silicate has a pH between 11-14, and preferably about 12.5±0.5.

In accordance with an embodiment, the mineral acid is selected from a group consisting of sulphuric acid, hydrochloric acid, nitric acid. In accordance with a related embodiment, the mineral acid has a molarity in a range of 0.1 M to 2 M, and preferably around 0.625 M.

In accordance with an embodiment, the aqueous medium is formed of water only.

In accordance with an embodiment, the reaction of the aqueous solution of metal silicate with the mineral acid is carried out by separately adding the aqueous solution of metal silicate, the mineral acid, and the surfactant solution to an aqueous medium heated up to the reaction temperature. In accordance with an embodiment, a reactor containing the aqueous medium and connected to a heater is simultaneously charged with the aqueous solution of the metal silicate, the mineral acid, and the surfactant solution to carry out aforesaid reaction. In accordance with an alternate embodiment, the reactor containing the aqueous medium and connected to the heater is first charged with the surfactant solution, followed by the addition of the metal silicate and the mineral acid. In accordance with a related embodiment, the surfactant solution is added to the aqueous medium at a temperature lower than the reaction temperature; and the aqueous medium comprising the surfactant solution is then heated till the reaction temperature.

In accordance with an embodiment, the aqueous solution of metal silicate, the mineral acid, and the surfactant solution are added in a continuous manner. In accordance with an alternate embodiment, the addition may be stopped intermittently to allow intermittent aging of the reaction mixture. The intermittent aging may be carried out for 10-30 minutes.

In accordance with an embodiment, the aqueous solution of metal silicate, the mineral acid, and the surfactant solution are simultaneously added to the aqueous medium over a time period in a range of 30 minutes to 2 hours. In accordance with a related embodiment, the addition rate of the metal silicate solution and the mineral acid is such that the metal silicate solution and the mineral acid are in a ratio of about 1:1 (based on volume). The addition rate of the metal silicate solution, and the mineral acid, may further be adjusted to maintain the pH of 10±0.3. In accordance with an embodiment, the surfactant solution is added such that the surfactant solution has a concentration of about 2.25 to 2.5% w/w with respect to the silica content of the metal silicate solution. Preferably, the surfactant solution is added such that the surfactant solution has a concentration of about 2.45% w/w with respect to the silica content of the metal silicate solution. For example, to prepare 450 grams of precipitated silica from 2 kg (1.5 litres) sodium silicate having a total solid content of 32% and silica content of 23%, the surfactant solution comprising 0.98% (i.e. 4.5 grams) of gelatin and 1.47% (i.e. 6.75 ml) of Surfactant-OT 85 AE w.r.t. silica content of sodium silicate is added.

In accordance with an embodiment, the reaction is carried out at the reaction temperature in a range of about 70 to 100° C. Preferably, the reaction temperature is 95° C. In accordance with an embodiment, the reaction mixture comprising metal silicate solution, the mineral acid, and the surfactant solution is continuously stirred. The stirring is carried out at a stirring rate in a range of 50 to 700 rpm. Preferably, the stirring is carried out at 400 rpm.

In accordance with an embodiment, once the reaction mixture has attained the pH of 10±0.3, it is allowed to age at the temperature in a range of about 70 to 100° C. for a time period of 10-100 minutes. Preferably, the aging is carried out for 60 minutes at 95° C.

In accordance with an embodiment, after the completion of the reaction at the pH of 10±0.3, the pH of the reaction is rapidly brought down to the pH of around 4. The pH of the reaction mixture is adjusted to about 4 from 10±0.3 by addition of the mineral acid. In accordance with an embodiment, the pH of the reaction mixture is first adjusted to about 2 from 10±0.3 and then to about 4. The pH of the reaction mixture is adjusted to about 2 from 100±0.3 by addition of the mineral acid and then to around 4 by addition of a base. The base may be any base known to a person skilled in the art. Preferably, the base is sodium hydroxide.

In accordance with an embodiment, the reaction mixture is allowed to age at the pH of about 4 for a time period in a range of 10 minutes to 2 hours. Preferably, the reaction mixture is allowed to age for 1 hour. In accordance with a related embodiment, the aging is carried out at a temperature in a range of 70 to 100° C. Preferably, the aging is carried out at 95° C. In accordance with an embodiment, the aging is carried out while continuously stirring the reaction mixture.

In accordance with an embodiment, the precipitated silica obtained upon completion of reaction is filtered followed by washing. Washing is done to eliminate the by products, such as sodium sulphate, obtained as a result of reaction. Thus obtained precipitated silica is then subjected to a drying step. The drying step may be carried out by spray drying, spin flash drying, or vacuum tray drying. Alternatively, the wet cake is subjected to short-term drying, followed by addition of a dispersing agent in a suitable solvent. The dispersion may then be dried to obtain precipitated silica. In accordance with an embodiment, the dispersion of silica is prepared using a dispersing agent selected from a group consisting of metal salt of saturated and unsaturated fatty esters with long hydrocarbon chain/fatty acids in an appropriate solvent selected from a group consisting of butanol, butanone, toluene and acetone.

The silica according to the present disclosure can be used in tyre rubber, rice roller rubber, shoe sole rubber or any other elastomers. Specifically, the silica disclosed herein is suitable for use as filler in vulcanizable or vulcanized elastomer compositions. The vulcanized elastomer composition can be used for the manufacture of tyre and other rubber products. In accordance with an embodiment, said silica may be used as a reinforcing filler in a quantity in a range of 7 to 90 phr. Any conventional process may be used to form vulcanizable or vulcanized elastomer compositions using the above disclosed silica as reinforcing filler.

Specific Embodiments are Discussed Below

Such a process of preparing precipitated silica, the process comprising:
reacting an aqueous solution of a metal silicate with a mineral acid in the presence of a surfactant solution comprising gelatin and $C_8$-$C_{20}$ sulfosuccinate blend, at a reaction temperature in a range of about 70 to 100° C. with constant stirring such that a reaction mixture having a pH of about 10+0.3 is obtained;
optionally, allowing the reaction mixture to age at a temperature in a range of about 70 to 100° C. for a time period in range of 10 to 100 minutes;
adjusting the pH of the reaction mixture to about 4, followed by aging said mixture at a temperature in a range of about 70 to 100° C. for a time period in a range of 10 minutes to 2 hours; and
recovering the precipitated silica from the reaction mixture.

Such a process, wherein the reaction of the aqueous solution of the metal silicate with the mineral acid is carried out by separately adding the aqueous solution of metal silicate, the mineral acid, and the surfactant solution to an aqueous medium heated up to the reaction temperature.

Such a process, wherein the metal silicate solution, the mineral acid, and the surfactant solution are simultaneously added to the aqueous medium over a time period in a range of 30 minutes to 2 hours.

Such a process, wherein the pH of the reaction mixture is adjusted to about 2 to 4 from pH 10±0.3.

Such a process, wherein the surfactant solution is prepared by dissolving gelatin in water followed by addition of $C_8$-$C_{20}$ sulfosuccinate blend at 50 to 80° C.

Such a process, wherein the surfactant solution comprises gelatin and $C_8$-$C_{20}$ sulfosuccinate blend in a ratio ranging from 1:1 to 1:3.

Such a process, wherein the aqueous solution of metal silicate has a $SiO_2$ content ranging from 7-30% (w/w).

Such a process, wherein the aqueous solution of metal silicate has a pH in a range of 11-14.

Such a process, wherein the mineral acid has a concentration in a range of 0.1-2 M.

Such a process further comprising washing the precipitated silica to remove unwanted residues, followed by drying and dispersing said precipitated silica in a dispersing agent.

Such a process, wherein the precipitated silica has:
a CTAB surface area in a range of 80 to 230 m²/g;
a BET surface area in a range of 100 to 250 m²/g;
a BET/CTAB ratio in a range of 0.8-1.35;
a DBP oil absorption in a range of 240-320 ml/10 g;
a CDBP coefficient ($D_A$) in range of 0.4-0.9;
a scars number ($V_2$) in a range of 10 to 30 ml/(5 g); and
a scars number ($V_2$)/CTA ratio in a range of 0.16-0.20 ml/(5 m²).

EXAMPLES

The following examples are provided to explain and illustrate the preferred embodiments of the present disclosure and do not in any way limit the scope of the disclosure as described:

Example 1: Process of Preparing Precipitated Silica in Accordance with Present Disclosure Sodium silicate solution used for the silica synthesis has a solid content of ~30.1% by wt. ($Na_2O$ to $SiO_2$ ratio=1:3.1, silica percentage by wt.=23%. $Na_2O$ percentage by wt.=7.1%). This solution has a pH value of 12.5±0.5.

1.25 M sulphuric acid solution was prepared by adding slowly 680 mililitre of concentrated sulphuric acid (% of sulphuric acid in the solution 98%, Sp. Gr. of the solution 1.84) to distilled water to make 10 litre solution.

To prepare the surfactant solution, 600 milliliter of distilled water was heated at 50-60° C. 7.5 grams of gelatin is added and stirred to dissolve gelatin in water. 11.2 milliliter of $C_8$-$C_{20}$ sulfosuccinate blend surfactant was further added to the above solution and stirred to mix.

In order to synthesize precipitated silica, 3 litres of distilled water was taken in a properly cleaned 25 litre jacketed reactor. The heater was set at 95° C. and the stirrer of the reactor was set at a stirring rate of 400 rpm. In the first stage, 3 litres of 1.25 M sulphuric acid and 3 litres of sodium silicate solution were taken in two separate beakers. 300 mililitre of surfactant solution was slowly added to the reactor while mixing. Three metering pumps were calibrated: $1^{st}$ for acid. $2^{nd}$ for sodium silicate addition and $3^{rd}$ for water addition. The addition rate of all the three pumps was set at 30 mililitres/minute. When the temperature of the reactor reached 95° C., the sodium silicate pump and the water metering pump were switched on simultaneously. Sodium silicate and water were then pumped at an addition rate of 30 mililitres/minute for 10 minutes to the reaction chamber. The pH of the solution in the reaction chamber was checked. At this point, it was ensured that the pi of the reaction mixture is between pH 9.7 to 10. Further on, the reaction was carried out in two stages. In the first stage, the sulphuric acid metering pump was switched on and sulphuric acid solution was added at an addition rate of 30 mililitres/minute to the reaction chamber, while continuing the addition of both sodium silicate and water at the addition rate of 30 mililitres/minute. The reaction mixture is stirred at 400 rpm. After 30 minutes, the addition of sulphuric acid, sodium silicate and water were stopped while continuing the stirring at 400 rpm and 95° C. reactor temperature. The reaction mixture was then allowed to age for 30 minutes. The pH of the solution in the reaction chamber was checked. At this point, it was ensured that the pH of the reaction mixture is between pH 9.7 to 10. In the second stage. 300 mililitres of the surfactant solution was added to the reactor. The addition of sulphuric acid and sodium silicate was started at the addition rate of 30 mililitres/minute and water at the addition rate of 45 mililitres/minute while stirring at 95° C. for next 60 minutes. The pH of the solution in the reaction chamber was checked. It was ensured that the pH of the reaction mixture is between pH 9.7 to 10. The addition of sulphuric acid, sodium silicate and water were stopped. The reaction mixture was allowed to age for another 70 minutes while stirring at 95° C. After 70 minutes of aging, sulphuric acid was added to the reaction mixture at 100 mililitres/minute. The pH was measured till the reaction mixture attained a pH of 4.0-4.7. After pH adjustment, the addition of sulphuric acid was stopped. The reaction mixture was allowed to age for 1 hour at 95° C. with continuous stirring.

At the end of the reaction, the precipitates were collected from the reactor. The precipitate was centrifuged at 4000 rpm for 5 minutes. The cake was collected and washed thoroughly with approximately 5 litre of distilled water to remove sodium sulphate. The solid content of the wet cake thus obtained was checked and found to be 12-15% by drying at 125° C. 2-4% (w/w) metal salt of saturated and unsaturated fatty esters with long hydrocarbon chain/fatty acids was added to the silica cake as dispersing agent followed by homogenization. Silica cake was then spray dried to powder. The moisture content of spray dried silica should be in the range of 2-5%. Post synthesis, a detailed characterization of synthesized precipitated silica was carried out. The properties were tabulated in the below table, table 1.

TABLE 1

Properties of precipitated silica of the present disclosure

| Sr. No. | Properties | Units | Value | Method |
|---|---|---|---|---|
| 1 | Appearance | | White fluffy powder | |
| 2 | Crystal structure | | Amorphous | X-ray Diffraction |
| 3 | Surface area ($N_2$) | m²/g | 160 | Multipoint-BET $N_2$ absorption method |
| 4 | CTAB surface area (CTAB) | m²/g | 140 | CTAB surface area (ASTM 3765) |
| 5 | DBP absorption value | ml/100 g $SiO_2$ | 320 | Oil absorption tester (ASTM D 2414) |
| 6 | Sears Number | ml/(5 g) | 25 | Method used as per U.S. Pat. No. 7,871,588 |
| 7 | CDBP coefficient ($D_A$) | Number | 0.69 | ASTM D-3493 |
| 8 | BET/CTAB surface area | Number | 1.142 | — |

TABLE 1-continued

Properties of precipitated silica of the present disclosure

| Sr. No. | Properties | Units | Value | Method |
|---|---|---|---|---|
| 9 | Sears number/CTAB surface area | ml/5 m² | 0.178 | — |

Example 2: Process of Preparing Precipitated Silica in Accordance with Present Disclosure Sodium silicate solution was prepared by mixing 6 kilograms of sodium silicate (Solid content ~45.5% by wt.; $Na_2O$ to $SiO_2$ ratio=1:2.5; $SiO_2$% by wt.=32.5%) in 6 litre of distilled water with stirring at 400 RPM for 15 minutes. The obtained sodium silica solution has a pH value of 12.5±0.5. Further, 1.25 M sulphuric acid solution is prepared by adding slowly 680 millilitres of concentrated sulphuric acid (% of sulphuric acid in the solution=98%, Sp. Gr of the solution=1.84) to distilled water to make 10 litre solution. The 1.25 M sulphuric acid solution is diluted 2 times by mixing 1.5 litre of 1.25 M sulphuric acid solution and 1.5 litre of water. The resultant sulphuric acid solution has a molarity of 0.625 M and pH 1±0.3. Gelatin and $C_8$-$C_{20}$ sulfosuccinate blend surfactant is prepared by first taking 600 millilitres of distilled water and heating it up to 50-60° C. followed by adding to it 3.75 grams of gelatin. The resultant mixture is stirred to dissolve gelatin in water. Subsequently, 5.6 milliliter of $C_8$-$C_{20}$ sulfosuccinate blend surfactant is added to it followed by stirring to obtain gelatin and $C_8$-$C_{20}$ sulfosuccinate blend surfactant.

To prepare precipitated silica, 3 litre of distilled water is taken in a properly cleaned 25 litre jacketed reactor connected to a heater. The heater and stirrer of the reactor are set at temperature of 95° C. and stirring rate of 400 rpm respectively. 600 ml of gelatin and $C_8$-$C_{20}$ sulfosuccinate blend surfactant is added to the reactor when temperature thereof reaches 70° C. Further, the reaction mixture in the reactor reaches 95° C., 3 litre of 0.625 M sulphuric acid solution and 3 litre of sodium silicate solution are simultaneously added thereto at an addition rate of 30 millilitres/minute. This reaction mixture was stirred at 400 rpm. After completion of the addition, the pH of the reaction mixture was checked. At the end of the reaction, pH should be 10±0.3. Once pH of 10±0.3 is obtained in the reaction mixture, 1.25 M sulfuric acid solution is added to the reactor to adjust the pH of the reaction mixture to 2±0.5 followed by addition of 5% NaOH solution to bring the pH to 4±0.5. Thereafter, the solution mixture was aged/maintained at 95° C. for 1 hour while stirring at 400 rpm. At the end of the reaction, precipitate was collected from the reactor.

The precipitate was centrifuged at 4000 rpm for 5 minutes. The filter cake thus obtained was collected and washed thoroughly with approximately 5 litre of distilled water to remove sodium sulphate. The solid content of the wet cake was checked and found to be 12-15% by drying at 125° C. A dispersion of 6-10% solid content was prepared thereafter by adding distilled water to obtain silica slurry Once silica slurry is prepared, metal salt of saturated and unsaturated fatty esters with long hydrocarbon chain/fatty acids was used as dispersing agent with a 2-4% w/w loading in an appropriate solvent (e g butanol, butanone, toluene and acetone) and added slowly to the 6-10% silica slurry by homogenizing in a high shear mixer for 15 minutes at 2000 rpm. The 6-10% silica slurry was then spray dried to powder. The moisture content of spray/spin flash dried silica should be in the range of 2-5%0. Post synthesis, a detailed characterization of synthesized precipitated silica was carried out. The properties were tabulated in the below table, table 2.

TABLE 2

Properties of precipitated silica of the present disclosure

| Sr. No. | Properties | Units | Value | Method |
|---|---|---|---|---|
| 1 | Appearance | | White fluffy powder | |
| 2 | Crystal structure | | Amorphous | X-ray Diffraction |
| 3 | Surface area ($N_2$) | m²/g | 140 | Multipoint-BET $N_2$ absorption method |
| 4 | CTAB surface area (CTAB) | m²/g | 125 | CTAB surface area (ASTM 3765) |
| 5 | DBP absorption value | ml/100 g $SiO_2$ | 280 | Oil absorption tester (ASTM D 2414) |
| 6 | Sears Number | ml/(5 g) | 26 | Method used as per U.S. Pat. No. 7,871,588 |
| 7 | CDBP coefficient ($D_A$) | Number | 0.7 | ASTM D-3493 |
| 8 | BET/CTAB surface area | Number | 1.12 | — |
| 9 | Sears number/CTAB surface area | ml/5 m² | 0.208 | — |

We claim:

1. A process of preparing a precipitated silica, the process comprising:
   reacting an aqueous solution of a metal silicate with a mineral acid in a presence of a surfactant solution comprising a gelatin and a $C_8$-$C_{20}$ sulfosuccinate blend, at a reaction temperature in a range of 70 to 100° C. with a constant stirring to form a reaction mixture such that the reaction mixture having a pH of about 10±0.3 is obtained;
   wherein the surfactant solution comprises the gelatin and the $C_8$-$C_{20}$ sulfosuccinate blend in a weight ratio ranging from 1:1 to 1:3:
   optionally, allowing the reaction mixture to age at a temperature in a range of 70 to 100° C. for a time period in range of 10 to 100 minutes;
   adjusting the pH of the reaction mixture to about 4, followed by aging said reaction mixture at a temperature in a range of 70 to 100° C. for a time period in a range of 10 minutes to 2 hours; and
   recovering the precipitated silica from the reaction mixture.

2. The process as claimed in claim 1, wherein the reaction of the aqueous solution of the metal silicate with the mineral acid is carried out by separately adding the aqueous solution of metal silicate, the mineral acid, and the surfactant solution to an aqueous medium heated up to the reaction temperature.

3. The process as claimed in claim 2, wherein the aqueous solution of the metal silicate, the mineral acid, and the surfactant solution are simultaneously added to the aqueous medium over a time period in a range of 30 minutes to 2 hours.

4. The process as claimed in claim 1, wherein the pH of the reaction mixture is adjusted to about 2 to 4 from pH 10±0.3.

5. The process as claimed in claim 1, wherein the surfactant solution is prepared by dissolving the gelatin in water followed by addition of the $C_8$-$C_{20}$ sulfosuccinate blend at 50 to 80° C.

6. The process as claimed in claim 1, wherein the aqueous solution of the metal silicate has a $SiO_2$ content ranging from 7-30% w/w.

7. The process as claimed in claim 1, wherein the aqueous solution of the metal silicate has a in a range of 11-14.

8. The process as claimed in claim 1, wherein the mineral acid has a concentration in a range of 0.1-2M.

9. The process as claimed in claim 1, further comprising washing the precipitated silica to remove unwanted residues, followed by drying and dispersing said precipitated silica in a dispersing agent.

10. The process as claimed in claim 8, wherein the precipitated silica has:
    a CTAB surface area in a range of 80 to 230 $m^2/g$;
    a BET surface area in a range of 100 to 2.50 $m^2/g$;
    a BET/CTAB ratio in a range of 0.8-1.35;
    a DBP oil absorption in a range of 240-320 ml/100 g;
    a CDBP coefficient ($D_A$) in range of 0.4-0.9;
    a sears number ($V_2$) in a range of 10 to 30 ml/(5 g); and
    a sears number ($V_2$)/CTAB ratio in a range of 0.16-0.20 ml/(5 $m^2$).

* * * * *